United States Patent
Berning et al.

(10) Patent No.: US 10,100,470 B2
(45) Date of Patent: Oct. 16, 2018

(54) AUTOMOTIVE MILLING MACHINE, AS WELL AS METHOD FOR DISCHARGING MILLED MATERIAL

(71) Applicant: Wirtgen GmbH, Windhagen (DE)

(72) Inventors: Christian Berning, Zuelpich (DE); Cyrus Barimani, Konigswinter (DE); Philip Verhaelen, Köln (DE)

(73) Assignee: Wirtgen GmbH (DE)

( * ) Notice: Subject to any disclaimer, the term of this patent is extended or adjusted under 35 U.S.C. 154(b) by 512 days.

(21) Appl. No.: 14/827,338

(22) Filed: Aug. 17, 2015

(65) Prior Publication Data

US 2016/0053445 A1    Feb. 25, 2016

(30) Foreign Application Priority Data

Aug. 21, 2014 (DE) .......................... 10 2014 216 603

(51) Int. Cl.
*E01C 23/088* (2006.01)
*E01C 23/09* (2006.01)
(Continued)

(52) U.S. Cl.
CPC ............ *E01C 23/01* (2013.01); *B65G 41/002* (2013.01); *B65G 67/22* (2013.01); *E01C 23/088* (2013.01); *E01C 23/127* (2013.01)

(58) Field of Classification Search
CPC ......... E01C 23/12; E01C 23/088; E01C 23/09
(Continued)

(56) References Cited

U.S. PATENT DOCUMENTS

| 3,608,968 A | 9/1971 | Burnett |
| 4,376,609 A | 3/1983 | Bohman et al. |

(Continued)

FOREIGN PATENT DOCUMENTS

| DE | 155157 | 5/1982 |
| DE | 19628420 A1 | 1/1998 |

(Continued)

OTHER PUBLICATIONS

Database Compendex XP-002538700, Engineering Information, Inc., Wolski Jan K, "Optimization of Bucket Wheel Excavator and Pit Parameters in Application to Overburden Stripping", Conference Proceeding "Use of Computers in the Coal Industry",1986, pp. 43-55.

(Continued)

*Primary Examiner* — Sunil Singh
(74) *Attorney, Agent, or Firm* — Lucian Wayne Beavers; Gary L. Montle; Patterson Intellectual Property Law, PC (57) ABSTRACT

In an automotive milling machine, comprising a machine frame, comprising a controller for the travelling and milling operation, comprising a working drum, comprising a transport conveyor for discharging the milled material milled off by the working drum onto a loading surface of a transport vehicle comprising a rear wall, where the transport conveyor is slewable, relative to the machine frame, about a first axis extending essentially horizontally under an elevation angle, and sideways about a second axis extending orthogonally to the first axis under a slewing angle, it is provided for the following features to be achieved: a detection device is arranged on the bottom side of the transport conveyor, where said detection device is used to initiate an activation signal in case of the transport conveyor approaching an object, in particular, the rear wall of the loading surface.

25 Claims, 6 Drawing Sheets

(51) Int. Cl.
*E01C 23/12* (2006.01)
*E01C 23/01* (2006.01)
*B65G 67/22* (2006.01)
*B65G 41/00* (2006.01)

(58) Field of Classification Search
USPC ............... 299/36.1, 39.1–39.8, 1.4, 1.5, 1.9; 404/90, 93–94, 75, 76
See application file for complete search history.

(56) References Cited

U.S. PATENT DOCUMENTS

| | | | |
|---|---|---|---|
| 4,863,009 | A | 9/1989 | Winkel et al. |
| 5,575,316 | A | 11/1996 | Pollklas |
| 5,857,274 | A | 1/1999 | Rüdiger et al. |
| 6,247,510 | B1 | 6/2001 | Diekhans et al. |
| 6,366,684 | B1 | 1/2002 | Turner |
| 6,457,779 | B1 | 10/2002 | Busley et al. |
| 6,682,416 | B2 | 1/2004 | Behnke et al. |
| 6,943,824 | B2 | 9/2005 | Alexia et al. |
| 7,831,345 | B2 | 11/2010 | Heino et al. |
| 8,499,537 | B2 | 8/2013 | Correns et al. |
| 8,528,988 | B2 | 9/2013 | Von Schönebeck et al. |
| 8,590,983 | B2 | 11/2013 | Berning et al. |
| 8,979,424 | B2 | 3/2015 | Berning et al. |
| 9,121,145 | B2 | 9/2015 | Berning et al. |
| 2005/0179309 | A1 | 8/2005 | Berning et al. |
| 2005/0207841 | A1 | 9/2005 | Holl et al. |
| 2006/0045621 | A1 | 3/2006 | Potts et al. |
| 2009/0044505 | A1 | 2/2009 | Huster et al. |
| 2009/0229233 | A1 | 9/2009 | Pollklass et al. |
| 2009/0267402 | A1 | 10/2009 | Berning et al. |
| 2010/0014917 | A1 | 1/2010 | Willis et al. |
| 2010/0296867 | A1 | 11/2010 | Buschmann et al. |
| 2011/0061762 | A1 | 3/2011 | Madsen et al. |
| 2011/0080034 | A1 | 4/2011 | Schönebeck et al. |
| 2011/0123268 | A1 | 5/2011 | Berning et al. |
| 2012/0263560 | A1 | 10/2012 | Diekhans et al. |
| 2013/0076101 | A1* | 3/2013 | Simon ............... E01C 23/088 299/39.2 |
| 2013/0080000 | A1* | 3/2013 | Von der Lippe ...... E01C 23/088 701/50 |
| 2013/0227922 | A1 | 9/2013 | Zametzer et al. |
| 2013/0269832 | A1 | 10/2013 | Gengerke |
| 2014/0054949 | A1* | 2/2014 | Berning ............... E01C 23/088 299/1.9 |
| 2015/0218762 | A1 | 8/2015 | Berning et al. |

FOREIGN PATENT DOCUMENTS

| | | |
|---|---|---|
| DE | 102005035480 A1 | 2/2007 |
| DE | 202007005756 U1 | 8/2008 |
| DE | 102009041842 A1 | 9/2011 |
| EP | 0666018 A1 | 8/1995 |
| EP | 1344445 A1 | 9/2003 |
| EP | 1574122 B1 | 9/2005 |
| EP | 2100495 A1 | 9/2009 |
| EP | 2301318 B1 | 11/2011 |
| EP | 2452551 A2 | 5/2012 |
| EP | 2573266 A2 | 3/2013 |
| EP | 2573267 A1 | 3/2013 |
| EP | 2700748 A1 | 2/2014 |
| JP | 1150415 A | 2/1999 |
| JP | 2002510000 A | 4/2002 |
| JP | 2008202396 A | 9/2008 |
| WO | 2009098294 A2 | 8/2009 |
| WO | 2014029824 A1 | 2/2014 |

OTHER PUBLICATIONS

Database Compendex XP-002538699, Engineering Information, Inc., Gove et al. "Optimizing Truck-Loader Matching", Mining Engineering, Oct. 1994, pp. 1179-1185, Soc. for Mining, Metallurgy & Exploration, Inc.
Russian Examination Report in corresponding Russian Patent Application 2015134846/03(053468) dated Aug. 18, 2015, pp. (not prior art).
European Search Report in corresponding European Patent Application EP 15 18 0914, dated Dec. 10, 2015, 9 pp. (not prior art).
Australian Patent Examination Report No. 1, in corresponding Australian Patent Application No. 2015215846, dated Feb. 5, 2016, 6 pp. (not prior art).

* cited by examiner

AUTOMOTIVE MILLING MACHINE, AS WELL AS METHOD FOR DISCHARGING MILLED MATERIAL

BACKGROUND OF THE INVENTION

1. Field of the Invention

The invention relates to an automotive milling machine, a method for discharging milled material, as well as a road or ground working unit.

2. Description of the Prior Art

With an automotive milling machine, it is known to discharge the milled material onto no less than one transport vehicle comprising a loading surface.

The milling machine comprises a controller for the travelling and milling operation, as well as a working drum for the milling of, for example, a road pavement. A transport conveyor device, for example, a transport conveyor device comprising no less than one transport conveyor, is present in front of or behind the working drum as seen in the direction of travel. The transport conveyor device comprises a discharge end at which the milled material is discharged onto the loading surface of the no less than one transport vehicle via a flight path in the form of a parabolic trajectory attributable to the conveying speed. The last or single transport conveyor of the transport conveyor device as seen in the direction of transport may be slewed sideways, relative to the longitudinal axis of the milling machine, under a specifiable slewing angle to the left or right and may be adjustable in height via a specifiable elevation angle. In addition, the conveying speed of the transport conveyor may be adjustable.

In practical operation, problems arise in coordinating the milling machine with the transport vehicle.

With a forward-loading milling machine, for example, the milled material is discharged towards the front onto the transport vehicle driving ahead. The operator of the milling machine needs to signal to the vehicle driver of the transport vehicle as to when the transport vehicle is to continue moving forward and when it is to stop. This leads to problems because the operator basically needs to concentrate on the milling process and at the same time needs to avoid a collision with the transport vehicle driving ahead. The information is usually communicated by means of sounding a horn so that, as soon as the vehicle driver of the transport vehicle hears the horn sounding, the transport vehicle is moved forward by a certain distance. In this context, a problem arises in the situation where the vehicle driver of the transport vehicle fails to hear the horn alert or if another vehicle driving past emits a horn alert. DE 10 2009 041 842 A (U.S. Pat. No. 8,979,424) addresses these problems. The following problems may arise: If the vehicle driver fails to hear the horn alert, and if the same does not drive the transport vehicle forward, this may cause a collision of the slewable transport conveyor of the transport conveyor device with the transport vehicle, or the operator of the milling machine needs to stop the continuous milling process.

If another vehicle driving past emits a horn alert, the vehicle driver of the transport vehicle may erroneously be of the opinion that he has to stop his vehicle. In this case, there is also the risk of collision.

An additional problem lies in the fact that the operator of the milling machine also needs to deal with loading the loading surface by adjusting the slewing angle, elevation angle and conveying speed of the last or single transport conveyor of the transport conveyor device as seen in the direction of transport and is thus distracted from his actual task of carrying out the milling operation. A correction of the slewing angle may be required, for example, when altering the steering direction of the milling machine.

In case of a rearward-loading milling machine, problems also arise in coordinating the milling machine with the transport vehicle especially as the transport vehicle needs to drive behind the milling machine in reverse travel. An even higher level of stress results for the operator of the milling machine as he needs to control the milling process in forward travel on the one hand, and needs to monitor loading of the transport vehicle behind the milling machine as seen in the direction of travel, needs to control the slewing angle, elevation angle and/or conveying speed of the transport conveyor device, and needs to communicate the necessary information to the vehicle driver on the other.

It is generally known to measure the distance between the milling machine and the transport vehicle by means of ultrasonic measuring systems or other distance measuring systems in order to avoid collisions between the milling machine and the transport vehicle. It is a problem in this context that the different transport vehicles do not have a uniform reference surface which the distance measurement could refer to. A different height of the rear wall of the transport vehicles and a different incline of the transport conveyor, in conjunction with different slewing angles of the transport conveyor, lead to collisions of the transport conveyor with the rear wall at entirely different distances between the milling machine and the transport vehicle. Basically, there is the problem that a sensor can only be aligned to non-clearly defined reference surfaces of different transport vehicles with considerable difficulty. Further problems exist if the transport vehicle is not aligned rectilinearly with the milling machine, or the transport container of the transport vehicle exhibits a slanting or, in any case, non-vertical rear wall. Distance measuring systems fail in particular if the transport vehicle is moved at a lateral offset to the milling machine and the transport conveyor can collide with a corner of the container.

SUMMARY OF THE INVENTION

It is therefore the object of the invention to specify an automotive milling machine as well as a method for discharging milled material of a milling machine which, in all operating situations, prevent damages to the milling machine during the coordination of the discharging process.

The invention advantageously specifies for a detection device to be arranged on the bottom side of the transport conveyor, where said detection device is used to initiate an activation signal in case of the transport conveyor approaching an object, in particular, the rear wall of the loading surface.

A collision with the container of the transport vehicle is safely prevented by means of the detection device arranged on the bottom side of the transport conveyor, irrespective of the elevation angle or slewing angle of the transport conveyor adjusted, irrespective of the relative angular position of the transport vehicle to the milling machine, and irrespective of the shape of the container at the rear wall and of the height of the rear wall of the container. The detection device offers the specific advantage of being independent of the movements of the transport vehicle and milling machine relative to one another.

It is preferably specified for the detection device to comprise no less than one planar-shaped or no less than one linear-shaped sensing element. Such sensing element is able to detect, on the bottom side of the transport conveyor over an extended section underneath the transport conveyor, contact with an object early and irrespective of the slewing position of the transport conveyor.

It is preferably specified for the sensing element to extend symmetrically to a longitudinal centre line of the transport conveyor and/or to extend at an essentially parallel distance to the transport conveyor. This enables a collision to be detected early without the transport conveyor, on the bottom side, and/or the collision object being damaged.

The sensing element may be flexible and may be comprised of a pull rope or of a flexible surface structure and extends linearly. The flexible sensing element may also be deflectable in order to maintain an essentially uniform distance to the bottom side of the transport conveyor and for adaptation to a curved shape of the transport conveyor.

Alternatively, the sensing element is rigid and is comprised of, for example, a rectangular-shaped plate element.

In case of contact with the rear wall of a loading surface or another object, the flexible or rigid sensing element of the detection device acts on the sensor which generates the activation signal and transmits it to the controller.

With a flexible sensing element, a tensile force may be detected at the ends of the element which arises through the displacement of the sensing element. A rigid sensing element may, for example, be attached to the transport conveyor in a parallelogram-type fashion so that the displacement of the suspension can be detected by the sensor.

A preferred embodiment specifies for the controller, in the presence of an activation signal, to generate a control signal for the reduction of the advance speed or for machine stoppage, and/or to increase the elevation angle of the transport conveyor, and/or to generate a drive signal for the vehicle driver of the transport vehicle.

It may alternatively or additionally be specified for the controller, in the presence of an activation signal, to generate an alarm signal and/or a signal for the reduction of the conveyor belt speed.

Reducing the conveyor belt speed serves to ensure that no milled material is discharged onto the roof of the driver's cabin of the transport vehicle by shortening the parabolic trajectory of the milled material.

The sensing element may be coupled to no less than one mechanically operatable or capacitive or inductive or optoelectronic sensor.

Alternatively, the sensing element may be formed of multiple capacitive or inductive or optoelectronic sensors arranged in a linearly or planarly distributed fashion.

According to a further alternative, the sensing element may be formed of no less than one light barrier.

It is possible to generate a locomotion control signal, for example, a visual or an audible signal, in accordance with the activation signal. Locomotion control signals for the transport vehicle have been generally described in DE 10 2009 041 842 A1.

The method according to the invention specifies for a detection device to be used on the bottom side of the transport conveyor, said detection device being used to generate an activation signal in the event of the transport conveyor approaching an object, in particular, the rear wall of the loading surface.

A preferred embodiment specifies for the controller to comprise a detection and control unit which automatically controls positioning of a point of impingement of the milled material.

Such controller enables the operator of the milling machine to concentrate on the milling operation and on travelling along a specified milling track. An automatic discharging procedure is thus realized which ensures automatic coordination of the discharging procedure with the movement of the milling machine and of the transport vehicle even when cornering. For example, the slewing angle of the last or single transport conveyor of the transport conveyor device as seen in the direction of transport may also be controllable in accordance with the steering angle of the automotive milling machine.

Hereinafter, embodiments of the invention are illustrated in more detail with reference to the drawings.

BRIEF DESCRIPTION OF THE DRAWINGS

The following is shown.

DETAILED DESCRIPTION

Figure 1:
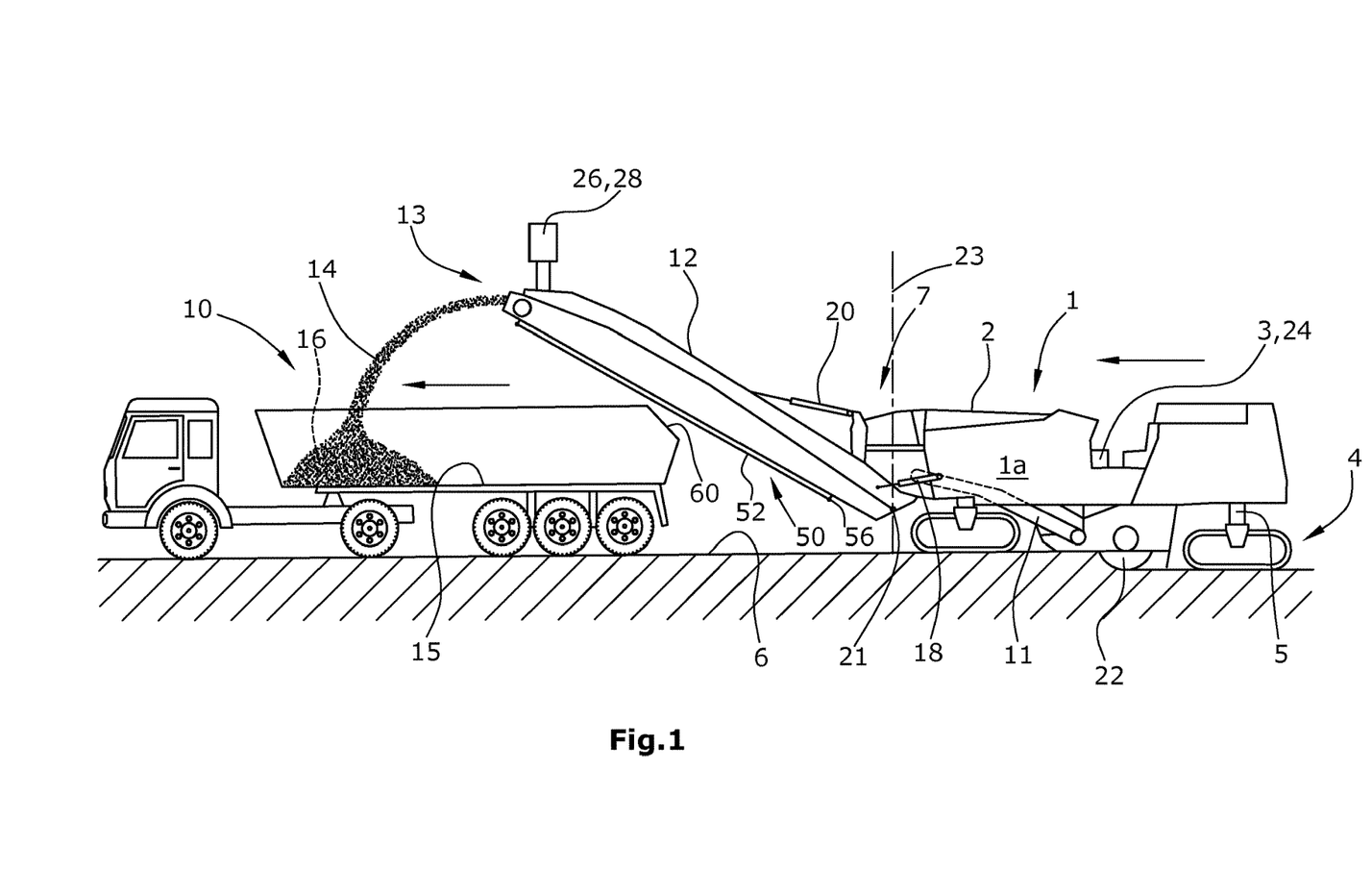
FIG. 1 a forward-loading road milling machine.

FIG. 1 shows a milling machine 1 using as an example a forward-loading road milling machine 1a. Said milling machine 1 comprises a machine frame 2 which is supported by a chassis 4 comprised of, for example, tracked ground-engaging units or wheels, said chassis 4 being connected to the machine frame 2 via no less than three height adjustment devices in the design of lifting columns 5. As can be inferred from FIG. 2, the embodiment specifies four lifting columns 5 which can be used to bring the machine frame 2 into a specifiable plane extending preferably parallel to the road surface 6 which supports the tracked ground-engaging units of the chassis 4.

The road milling machine shown in FIG. 1 comprises, in longitudinal direction of the milling machine 1a, a working drum 22 between the tracked ground-engaging units of the chassis 4.

The milling machines 1a, 1b may comprise tracked ground-engaging units and/or wheels. The working drum may be adjustable in height via the lifting columns 5 supporting the machine frame 2 or relative to the machine frame 2.

Other designs of a milling machine 1b may also exhibit the working drum 22, for example, at the height of the rear tracked ground-engaging units or wheels of the chassis 4.

The transport conveyor device with no less than one transport conveyor 11, 12 for transporting away the milled-off milled material may also be arranged at the front end 7 or rear end 8 of the milling machine 1a, 1b.

Figure 2:
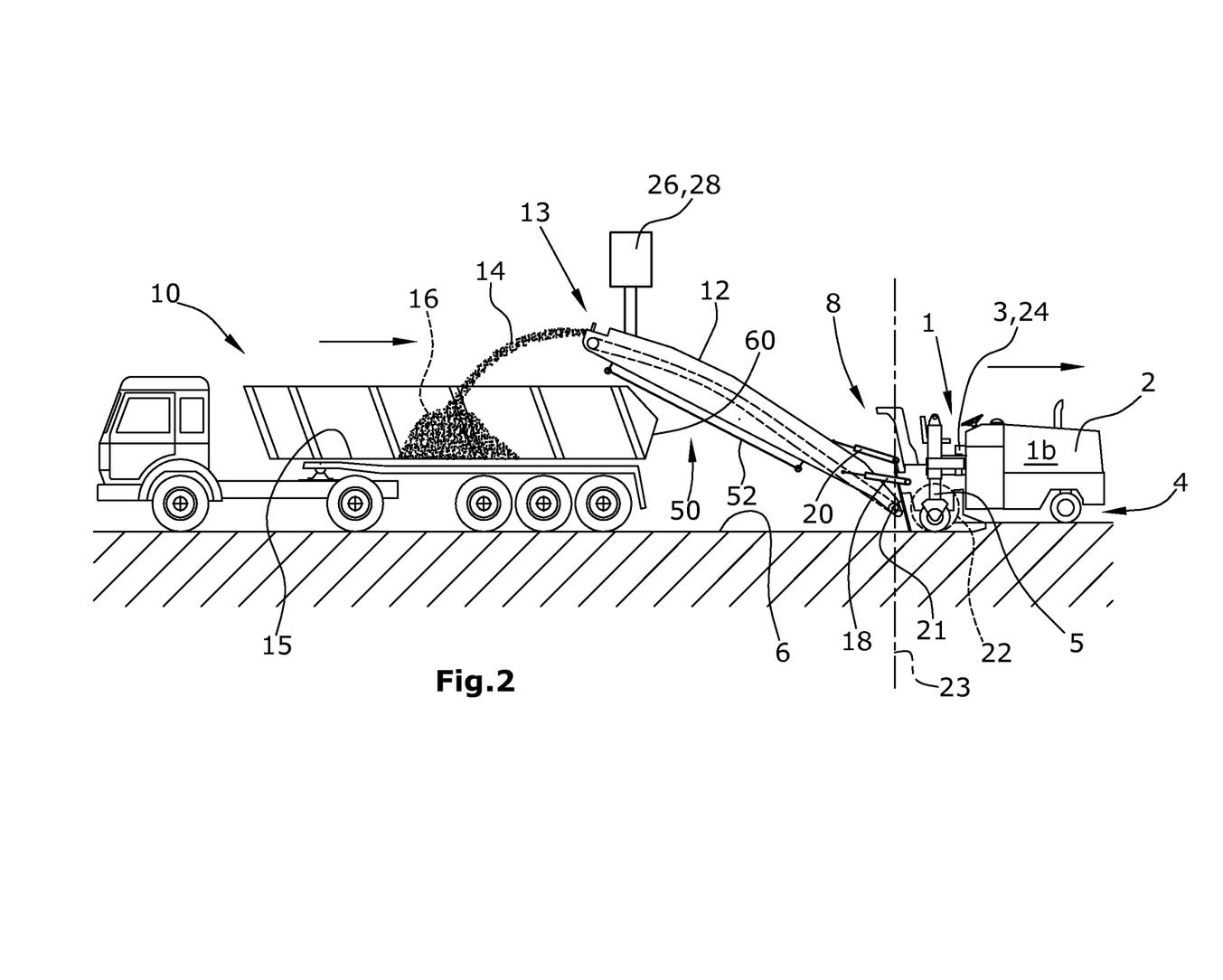
FIG. 2 a rearward-loading road milling machine.

FIG. 2 shows a rearward-loading milling machine 1b as an example in which the transport vehicle 10 drives behind the milling machine 1 in reverse travel.

Figure 3:
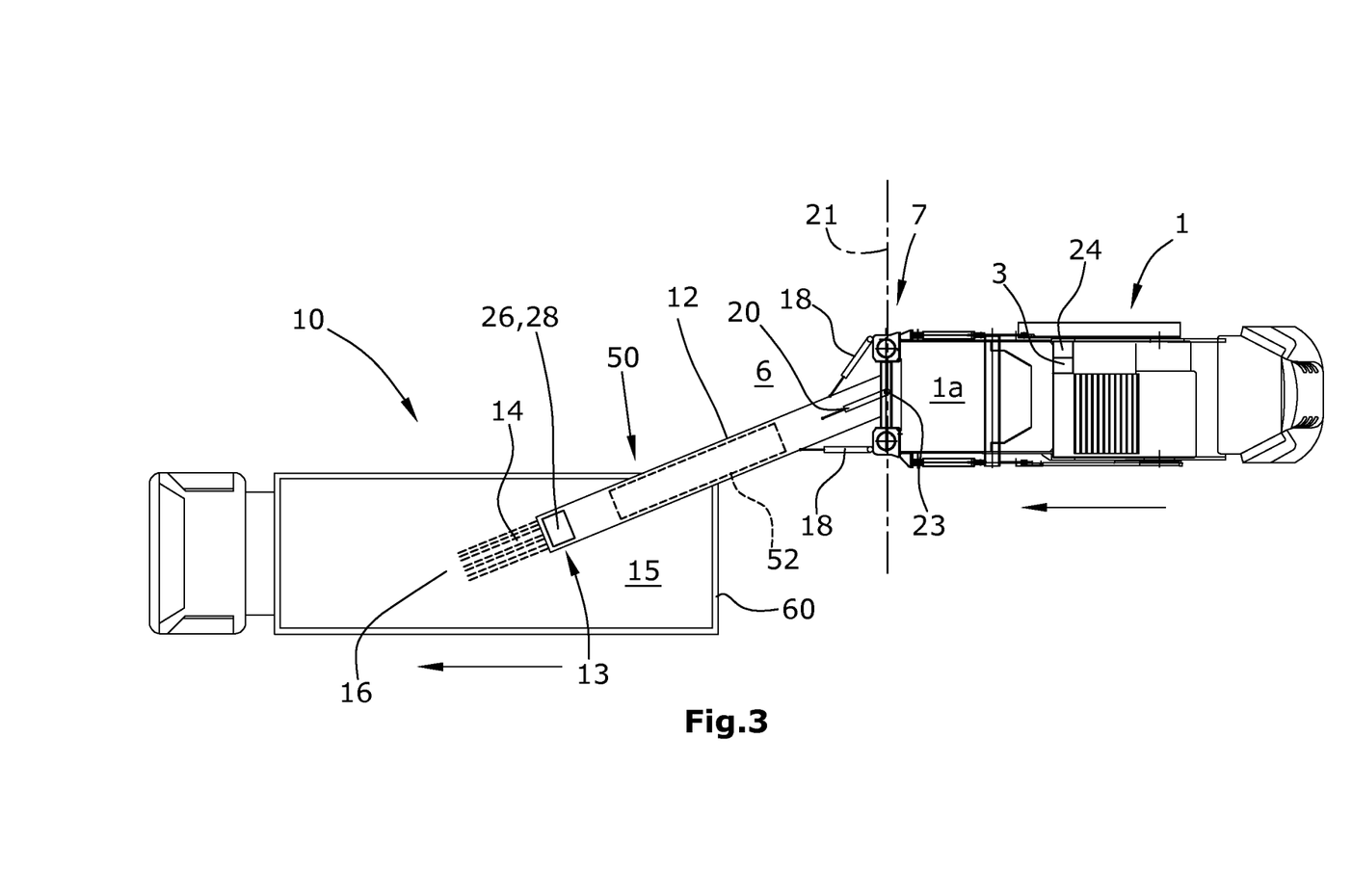
FIG. 3 a top view of a milling machine according to FIG. 1.

Provided that sufficient space is available on the side next to the milling machine 1a, 1b, the transport vehicle 10 may also be moved in forward travel in front of the milling machine 1 on a different track as shown in FIG. 3.

The directions of travel of the respective vehicles in FIGS. 1 to 3 are indicated by arrows.

In the embodiment shown in FIG. 1, the milled material milled off by the working drum 22 is discharged onto the loading surface 15 of the transport vehicle 10 via a first permanently installed transport conveyor 11 of the transport conveyor device which transfers the milled material 14 onto a second slewable transport conveyor 12. As a result of the speed of the transport conveyor 12, the milled material 14 is not discharged immediately at the end of the transport conveyor 12, but the milled material follows a parabolic trajectory so that the point of impingement 16 on the loading surface 15 is present at a distance from the free end 13 of the transport conveyor 12. The transport conveyor 12 is slewable from a neutral position to the left or to the right via piston-cylinder units 18 in order to be able to discharge the milled material 14 onto the loading surface 15 even when cornering or in the event of the transport vehicle 10 driving in an offset track. In addition, the vehicle driver of the milling machine 1a, 1b can adjust the elevation angle of the transport conveyor 12 by means of a piston-cylinder unit 20. The elevation angle has an influence on the parabolic trajectory of the milled material 14 and on the position of the point of impingement 16, as has the conveying speed of the transport conveyor 12.

The currently adjusted elevation angle about a horizontal first axis 21 or slewing angle about a vertical second axis 23, respectively, is reported to a detection and control unit 24 further comprising no less than one detector 26 which continuously detects the position of the loading surface 15 and/or of the last or single transport conveyor 12 as seen in the direction of transport. Said detector 26 is arrangeable either at the milling machine 1a, 1b, at the end facing the transport conveyor device, or at the free end 13 of the transport conveyor 12.

The detection and control unit 24 is capable of being integrated into the controller 3 for the travelling and milling operation or, as a minimum, is connectable to the same in order to, should the need arise, also obtain data on the travel speed and/or a detected steering angle of the milling machine 1a, 1b and the conveying speed of the transport conveyor 12.

FIGS. 1 and 2 show a detection device 50 on the bottom side of the transport conveyor 12, said detection device 50 comprising a linear-shaped sensing element 52. The sensing element 52 may be comprised of, for example, no less than one rope-type or wire-type element which extends essentially parallel and at a distance to the transport conveyor 12 and is clamped at the ends of the same in such a fashion that no less than one sensor 56 can detect a displacement of the sensing element 52.

Figure 5:
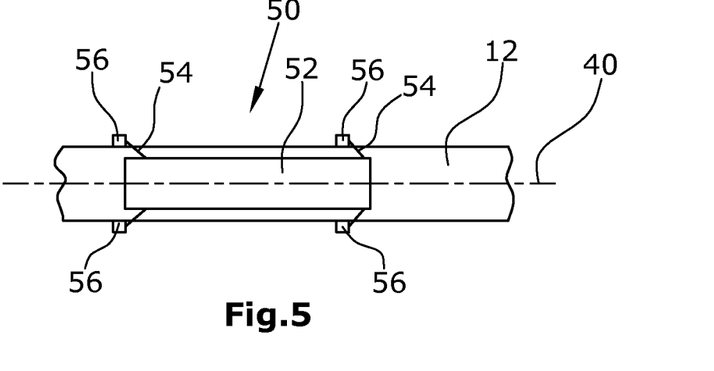
FIG. 5 a view of the bottom side of the transport conveyor according to FIG. 1.
Figure 6:
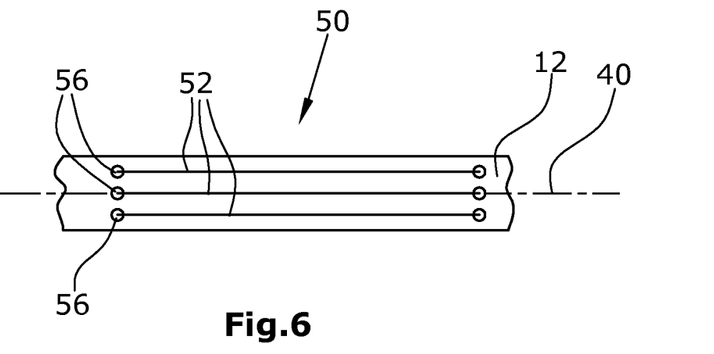
FIG. 6 an alternative embodiment.

The sensing element 52 extends preferably symmetrically to a longitudinal centre line 40 of the transport conveyor 12, as can best be inferred from FIGS. 5 and 6. The sensing element 52 may, for example, be formed of wire ropes (FIG. 6) or of a flexible surface structure which is fastened similar to the linear-shaped sensing element in such a fashion that a displacement of the surface structure when in contact with an object or with the rear wall 60 of the transport vehicle 10 initiates, via no less than one sensor 56, an activation signal which is feedable to the controller 3.

Figure 4:
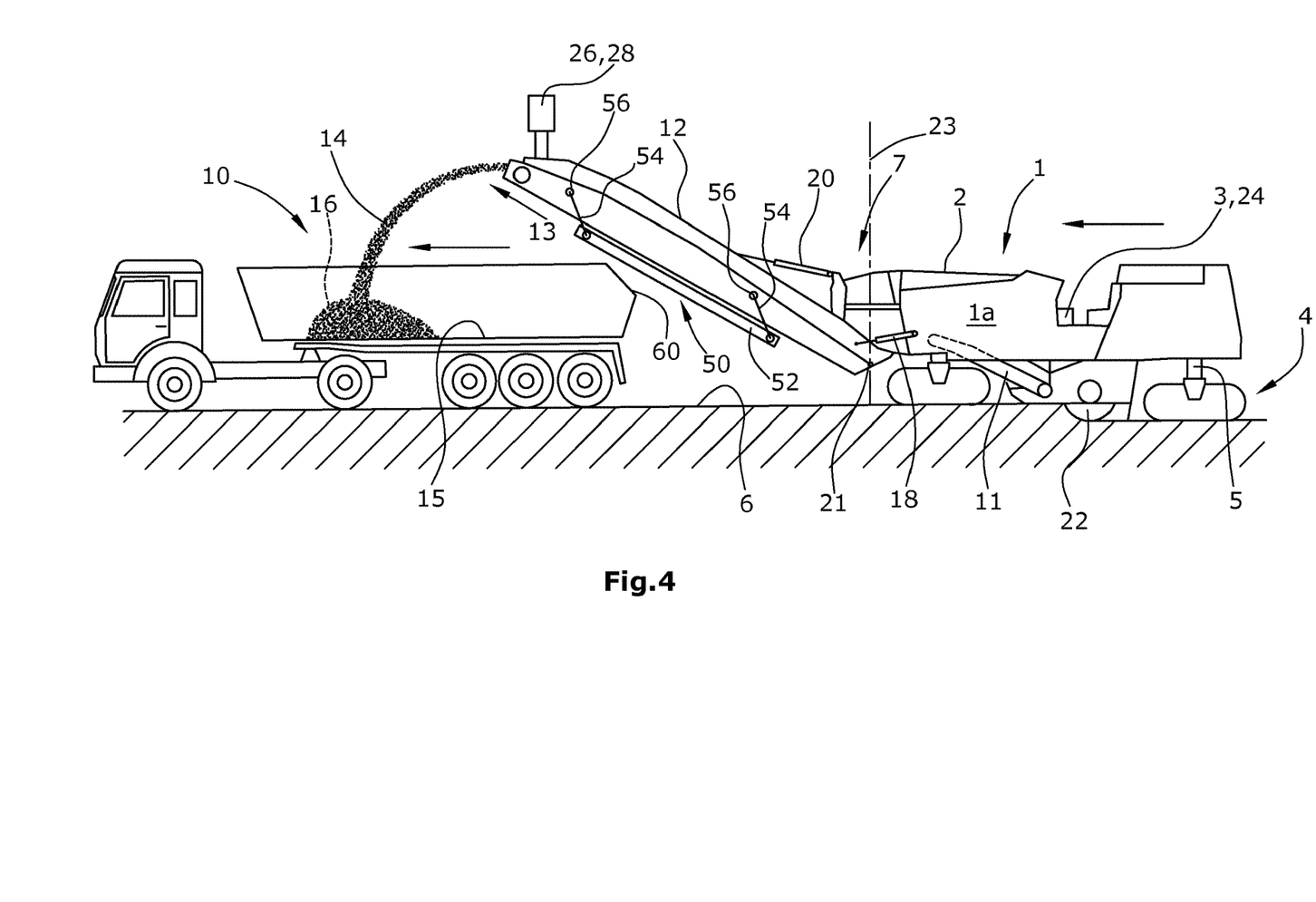
FIG. 4 a further embodiment.

The sensing element may also be comprised of a rigid plate element which is attached at the transport conveyor 12 in a parallelogram-type fashion as shown in FIGS. 4 and 5. In this arrangement, the sensors 56 may be designed, for example, as rotary angle sensors which, at the joints, can detect a movement of the suspension 54. It is understood that the plate-shaped sensing element 52 can be retained in its unloaded position, for example, by means of spring force, and is displaced only in the event of contact with an object.

The sensing elements 52 may each be coupled to no less than one mechanically operatable sensor or to a capacitive or inductive or optoelectronic sensor.

Figure 7:
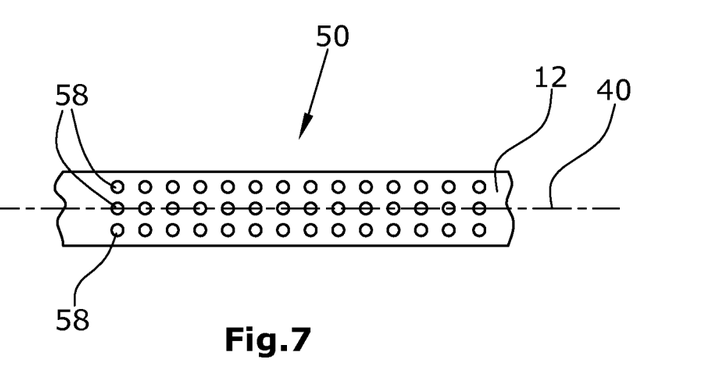
FIG. 7 a further embodiment with sensors arranged in a planar fashion.

According to an alternative illustrated in FIG. 7, the detection device 50 may, in the areas of the flexible or rigid sensing elements 52 inferable from FIGS. 1 to 6, be formed of multiple capacitive or inductive or optoelectronic sensors 58 arranged in a linearly or planarly distributed fashion.

Figure 8:
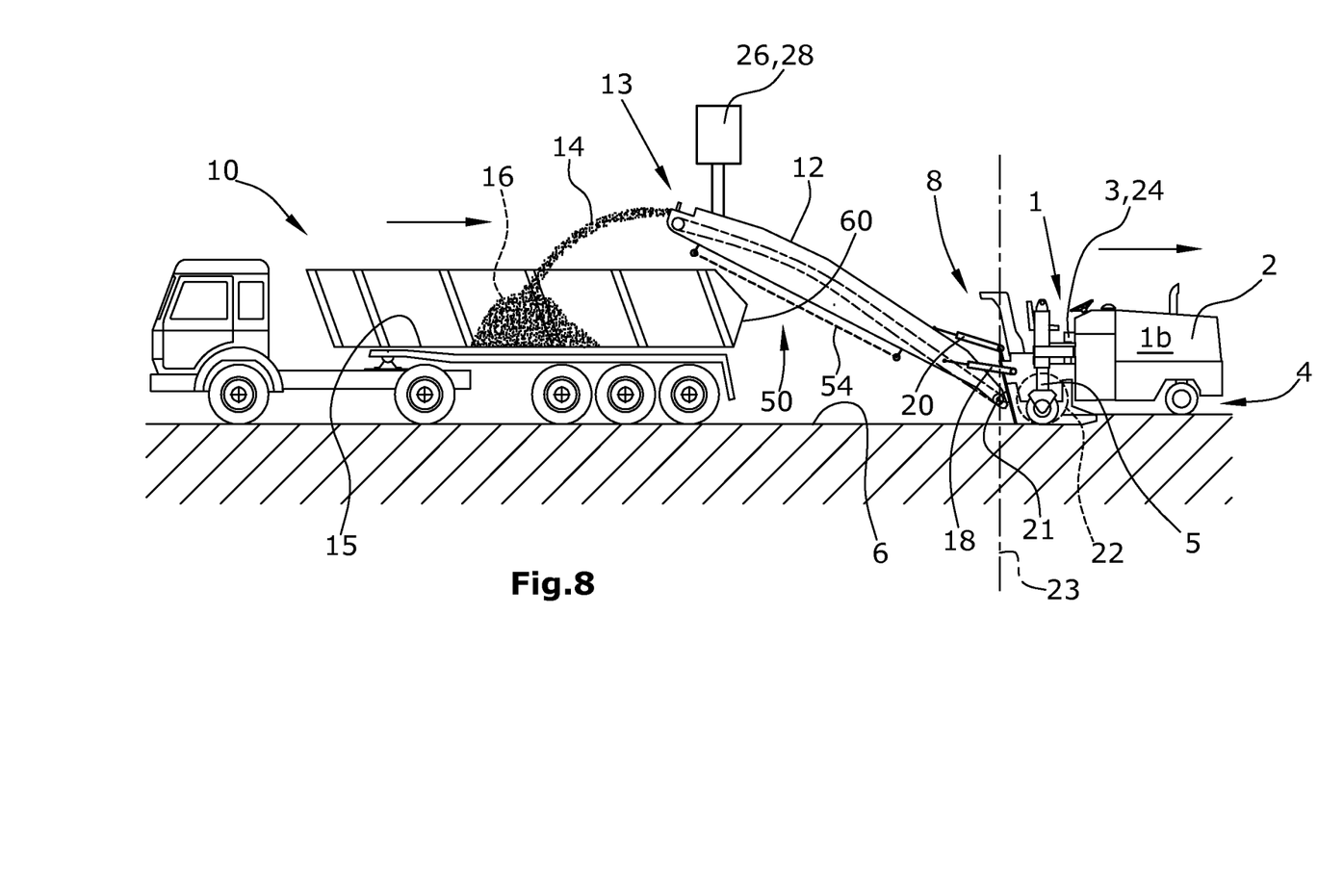
FIG. 8 an embodiment comprising a light barrier.

According to a further alternative shown in FIG. 8, the detection device 50 may be formed, for example, in the areas of the flexible or rigid sensing elements 52 inferable from FIGS. 1 to 6, of no less than one light barrier 54.

The longitudinal extension of the detection device 50 may essentially extend over the major part of the length of the transport conveyor 12, as is shown in FIG. 1, or may extend to a partial area being of interest only, as is illustrated in FIGS. 2 and 4.

The detection and control unit 24 can locate the alterable position of the loading surface 15 of the transport vehicle 10 and of the transport conveyor 12 relative to the machine frame 2, and continuously and automatically control positioning of the point of impingement 16 of the milled material 14 via the slewing angle and/or the elevation angle and/or the conveying speed of the transport conveyor device so that the discharged milled material 14 impinges, as a minimum, within the loading surface 15. Alternatively, the alterable position of the loading surface 15 of the transport vehicle 10 may also be continuously located relative to the transport conveyor 12 in order to perform the control operation.

The invention claimed is:

1. An automotive milling machine for milling off milled material and discharging the milled material onto a loading surface of a transport vehicle, the milling machine comprising:
    a machine frame;
    a working drum supported from the machine frame for milling off the milled material;
    a transport conveyor arranged to receive the milled material milled off by the working drum and to discharge the milled material onto the loading surface of the transport vehicle, the transport conveyor being mounted on the machine frame to be pivotable relative to the machine frame about an essentially horizontal first axis to define an elevation angle, and the transport conveyor being pivotable sideways about a second axis extending orthogonally to the first axis to define a slewing angle, the transport conveyor including a bottom side;
    a first detector configured to detect one or more of a position of the loading surface and a position of the conveyor as seen in the direction of transport;
    a second detector arranged on the bottom side of the transport conveyor and configured to initiate an activation signal in case of contact by the second detector with an object; and
    a controller connected to the first detector and the second detector, and configured to control travelling operation and milling operation of the milling machine based at least in part on the detected one or more of the position of the loading surface and the position of the conveyor as seen in the direction of transport, and
    wherein the controller is further configured, responsive to the activation signal from the second detector, to generate one or more of an alarm signal and a control signal for collision avoidance.

2. The automotive milling machine of claim 1, wherein: the second detector comprises at least one sensing element.

3. The automotive milling machine of claim 2, wherein: the at least one sensing element comprises at least one planar-shaped sensing element.

4. The automotive milling machine of claim 2, wherein: the at least one sensing element comprises at least one linear-shaped sensing element.

5. The automotive milling machine of claim 2, wherein: the at least one sensing element extends symmetrically to a longitudinal center line of the transport conveyor.

6. The automotive milling machine of claim 2, wherein: the at least one sensing element extends essentially parallel to the transport conveyor at a distance from the transport conveyor.

7. The automotive milling machine of claim 2, wherein: the second detector further comprises a sensor, and in case of contact of the at least one sensing element with an object, the sensing element acts on the sensor and the sensor generates the activation signal.

8. The automotive milling machine of claim 1, wherein: the control signal is configured to reduce an advance speed of the milling machine.

9. The automotive milling machine of claim 1, wherein: the control signal is configured to increase the elevation angle of the transport conveyor.

10. The automotive milling machine of claim 1, wherein: the control signal is configured as a drive signal for a vehicle driver of the transport vehicle.

11. The automotive milling machine of claim 1, wherein: the controller is further configured to generate a signal for a reduction of a conveyor belt speed in response to the activation signal from the second detector.

12. The automotive milling machine of claim 1, wherein the second detector comprises:
at least one sensing element; and
at least one sensor coupled to the at least one sensing element, the at least one sensor being selected from the group consisting of a mechanically operable sensor, a capacitive sensor, an inductive sensor, and an optoelectronic sensor.

13. The automotive milling machine of claim 1, wherein: the second detector comprises a plurality of linearly distributed sensors.

14. The automotive milling machine of claim 1, wherein: the second detector comprises a plurality of planarly distributed sensors.

15. The automotive milling machine of claim 1, wherein: the second detector comprises at least one light barrier.

16. The automotive milling machine of claim 1, in combination with at least one transport vehicle movable independently of the milling machine and positionable relative to the milling machine such that the milled material worked off by the milling machine is dischargeable onto the transport vehicle.

17. A method of discharging worked-off milled material of an automotive milling machine onto a loading surface of a transport vehicle, the method comprising:
(a) working off milled material with a working drum of the milling machine;
(b) transporting the milled material from the working drum with a transport conveyor and discharging the milled material from the transport conveyor onto the loading surface of the transport vehicle, the transport conveyor being pivotable sideways relative to a machine frame of the milling machine to adjust a slewing angle of the transport conveyor, and the transport conveyor having an adjustable elevation angle to adjust a discharge height of the transport conveyor, wherein control of the discharging of the milled material is based at least in part on information from a first detector corresponding to a detected position of one or more of the loading surface and the transport conveyor;
(c) generating an activation signal in an event of the transport conveyor approaching an object, the activation signal being generated upon contact with the object by a second detector located on a bottom side of the transport conveyor; and
(d) in the presence of an activation signal from step (c), generating one or more of a control signal and an alarm signal.

18. The method of claim 17, wherein:
in step (c), the second detector includes at least one planar-shaped sensing element.

19. The method of claim 17, wherein:
in step (c), the second detector includes at least one linear-shaped sensing element.

20. The method of claim 17, further comprising:
automatically reducing an advance speed of the milling machine in response to the control signal.

21. The method of claim 17, further comprising:
automatically stopping the milling machine in response to the control signal.

22. The method of claim 17, further comprising:
automatically increasing the elevation angle of the transport conveyor in response to the control signal.

23. The method of claim 17, wherein generating a control signal in step (d) further comprises generating a drive signal for a vehicle driver of the transport vehicle.

24. The method of claim 17, wherein generating a control signal in step (d) further comprises generating a signal for a reduction of a conveyor belt speed.

25. The method of claim 17, further comprising:
automatically controlling a point of impingement of the milled material on the loading surface.

* * * * *